(12) United States Patent
Zhu et al.

(10) Patent No.: US 9,680,542 B2
(45) Date of Patent: Jun. 13, 2017

(54) PRECODING IN A WIRELESS COMMUNICATION NETWORK

(71) Applicant: Telefonaktiebolaget LM Ericsson (publ), Stockholm (SE)

(72) Inventors: Huaisong Zhu, Beijing (CN); Jianfeng Wang, Beijing (CN); Hai Wang, Beijing (CN); Yang Hu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/107,822

(22) PCT Filed: Dec. 26, 2013

(86) PCT No.: PCT/CN2013/090526
§ 371 (c)(1),
(2) Date: Jun. 23, 2016

(87) PCT Pub. No.: WO2015/096083
PCT Pub. Date: Jul. 2, 2015

(65) Prior Publication Data
US 2016/0329942 A1    Nov. 10, 2016

(51) Int. Cl.
*H04L 27/00*    (2006.01)
*H03C 3/00*    (2006.01)
*H04B 7/0456*    (2017.01)
*H04L 25/03*    (2006.01)
(Continued)

(52) U.S. Cl.
CPC ........ *H04B 7/0456* (2013.01); *H04B 7/0417* (2013.01); *H04B 7/0623* (2013.01); *H04B 7/0632* (2013.01); *H04B 7/0686* (2013.01); *H04L 25/03898* (2013.01); *H04L 25/03942* (2013.01)

(58) Field of Classification Search
USPC ................. 375/219, 220, 222, 221, 240, 375/240.26–240.27, 259, 267, 284, 285, 375/286, 295, 299, 300, 302, 316, 320, 375/322, 324, 325, 340, 346, 347, 348, 375/354
See application file for complete search history.

(56) References Cited

U.S. PATENT DOCUMENTS

| 7,995,671 | B2 * | 8/2011 | Kim | .......... H04L 1/06 375/267 |
| 8,699,602 | B2 * | 4/2014 | Chen | ............ H04L 1/0026 370/208 |

(Continued)

FOREIGN PATENT DOCUMENTS

| CN | 101282564 A | 10/2008 |
| CN | 101606329 A | 12/2009 |
| WO | 2012079202 A1 | 6/2012 |

*Primary Examiner* — Linda Wong
(74) *Attorney, Agent, or Firm* — Murphy, Bilak & Homiller, PLLC

(57) ABSTRACT

A method for performing precoding in a wireless communication system is disclosed. The method includes obtaining a parameter indicative of reception quality on a downlink channel from a base station to a user equipment (UE) served by the base station; comparing the parameter with a predetermined reception quality threshold; and based on the comparison result, selecting a precoding mechanism for use in communicating with the UE.

8 Claims, 3 Drawing Sheets

(51) Int. Cl.
  *H04B 7/06* (2006.01)
  *H04B 7/0417* (2017.01)

(56) References Cited

U.S. PATENT DOCUMENTS

| | | | | |
|---|---|---|---|---|
| 9,019,849 B2* | 4/2015 | Hui | ............... | H01Q 3/2611 |
| | | | | 370/252 |
| 2010/0180170 A1* | 7/2010 | Seo | ............... | H04B 7/0691 |
| | | | | 714/748 |
| 2010/0254474 A1* | 10/2010 | Gomadam | ............... | H04B 7/0417 |
| | | | | 375/267 |
| 2011/0176439 A1 | 7/2011 | Mondal et al. | | |
| 2012/0201329 A1* | 8/2012 | Zhang | ............... | H04L 1/0606 |
| | | | | 375/296 |
| 2013/0094344 A1* | 4/2013 | Zhang | ............... | H04B 7/0456 |
| | | | | 370/208 |
| 2013/0230007 A1* | 9/2013 | Nagata | ............... | H04L 1/0026 |
| | | | | 370/329 |
| 2013/0294279 A1* | 11/2013 | Nagata | ............... | H04B 7/024 |
| | | | | 370/252 |
| 2014/0341312 A1* | 11/2014 | Lee | ............... | H04L 1/06 |
| | | | | 375/267 |

* cited by examiner

PRECODING IN A WIRELESS COMMUNICATION NETWORK

TECHNICAL FIELD

The present disclosure relates to wireless communication, and in particular, to precoding in a wireless communication network.

BACKGROUND

It is known that the use of multiple antennas at the transmitter and/or the receiver in a wireless communication system can significantly boost the performance of the wireless system. Such antenna configurations have the potential of both improving data rates, improving link reliability and/or increasing coverage.

Precoding is a multi-antenna technique for improving the performance of a multi-antenna system by transforming the information carrying transmit vector so that it better fits the channel conditions. Precoding is usually used in transmitters to mitigate distortion introduced by channel response. There are two common ways of realizing precoding, i.e. codebook based precoding or non-codebook based precoding.

In codebook based precoding, a transmitter and a receiver may have a common precoding codebook, i.e. a finite collection of precoding matrices. The receiver, for example a user equipment, typically decides which matrix or matrices of the codebook are selected for use and feedbacks its index to a transmitter, for example a base station (e.g. an eNB in a Long Term Evolution (LTE) system), on a feedback channel.

In non-codebook precoding, the base station may estimate the uplink channel state, for example based on transmission of uplink sounding reference signals and rely on uplink/downlink channel reciprocity when selecting a precoding matrix to use for the downlink transmission. This is especially of interest for time division duplex (TDD) operation for which the use of the same frequency for uplink and downlink transmission typically leads to a higher degree of downlink/uplink channel reciprocity.

A TDD communication system may have a narrow bandwidth (e.g. a bandwidth of 0.72 MHz) or a wide bandwidth (e.g. a bandwidth of 18 MHz). For a narrow band communication system, it is possible to transmit and detect uplink sounding reference signals over the whole bandwidth and then relatively accurate information about the uplink can be used to determine a precoding matrix for the downlink transmission. However, for a wideband communication system, if uplink sounding reference signals were transmitted and detected over the whole bandwidth, a lot of sounding resources would be consumed and this would increase processing complexity at the base station. To reduce the sounding resource requirement and the base station processing requirement, an approach is to use a small portion of the wide band for uplink sounding reference signal transmission and detection and a precoding matrix determined based thereon for this portion of the band will be used for the whole bandwidth. Another approach as described in WO 2012079202A1 is to adjust the precoding matrix determined for the small portion of the band and use the adjusted precoding matrix for the remaining portions of the band where no uplink sounding reference signal is transmitted.

Currently, when deploying a base station, operators need to manually select one of the approaches for use in a cell served by the base station. That is to say, a precoding mechanism needs to be configured on a cell specific basis. However, even within one cell, air channel is different for different user equipments and neither of the two approaches described above can guarantee to achieve a good performance in all air channel conditions.

SUMMARY

It is therefore an object to address some of the problems outlines above, and to provide an optimized solution for selecting a precoding mechanism for downlink transmission to a user equipment.

According to a first aspect of the present disclosure, a method for performing precoding in a wireless communication system is disclosed. The method includes obtaining a parameter indicative of reception quality on a downlink channel from a base station to a user equipment (UE) served by the base station; comparing the parameter with a predetermined reception quality threshold; and based on the comparison result, selecting a precoding mechanism for use in communicating with the UE.

In an example, the parameter may be obtained based on acknowledge/negative acknowledge (ACK/NACK) feedback transmitted from the UE. For example, the parameter may be associated with a block error ratio (BLER), a downlink retransmission number and a downlink outer-loop adjustment value.

In an example, a frequency band over which wireless communications are carried out in the wireless communication system may comprise a plurality of sub-bands and a precoding matrix for the UE for one of the sub-bands may be determined based on uplink measurement over the one of the sub-bands. In this example, the precoding mechanism for use in communicating with the UE may be selected from a first precoding mechanism where a precoding matrix for the UE for each of the other sub-bands is determined as the precoding matrix for the one of the sub-bands and a second precoding mechanism where a precoding matrix for the UE for each of the other sub-bands is determined as the precoding matrix for the one of the sub-bands adjusted by a predefined diversity matrix for said each of the other sub-bands. For instance, if the parameter is higher than the predetermined reception quality threshold, the second precoding mechanism may be selected and if the parameter is lower than the predetermined reception quality threshold, the first precoding mechanism may be selected.

According to a second aspect of the present disclosure, an apparatus for performing precoding in a wireless communication system is disclosed. The apparatus comprises an obtaining module, a comparing module and a selecting module. The obtaining module is configured to obtain a parameter indicative of reception quality on a downlink channel from a base station to a user equipment (UE) served by the base station. The comparing module is configured to compare the parameter with a predetermined reception quality threshold. The selecting module is configured to select a precoding mechanism for use in communicating with the UE based on comparison result provided by the comparing module.

According to a third aspect of the present disclosure, a base station including the apparatus according to the second aspect is disclosed.

According to a fourth aspect of the present disclosure, a base station is disclosed. The base station comprises a processor and a memory. The memory contains instructions executable by the processor, whereby the base station is operative to carry out operations as described above according to the first aspect of the present disclosure.

According to a fifth aspect of the present disclosure, a non-transitory computer-readable medium containing instructions stored thereon is disclosed. When executed by a base station, the instructions cause the base station to perform operations. The instructions comprise program code to carry out operations as described above according to the first aspect of the present disclosure.

According to some embodiments of the present disclosure, a precoding mechanism is selected based on the reception quality on the downlink channel from a base station to a UE served by the base station. In this way, a precoding mechanism suitable for the downlink channel characteristics can be automatically selected on a per-UE basis for use in communication with the UE. This can ensure a good reception quality for each UE and help improve the system performance in comparison with the approach of configuring only one precoding mechanism for all UEs in a cell.

BRIEF DESCRIPTION OF THE DRAWINGS

The above and other aspects, features, and benefits of various embodiments herein will become more fully apparent, by way of example, from the following detailed description and the accompanying drawings, in which.

DETAILED DESCRIPTION

Figure 1:
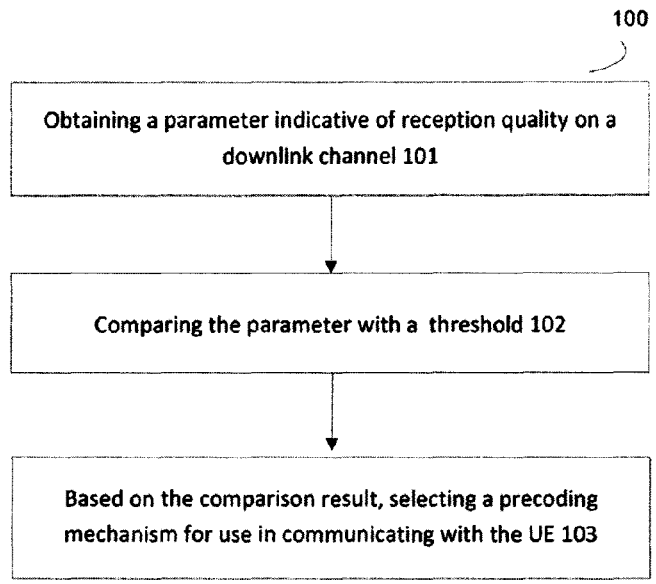
FIG. 1 is a flow diagram of a method for performing precoding according to an embodiment of the present disclosure.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not to obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

Although the description is given for user equipment (UE), it should be understood by the skilled in the art that "UE" is a non-limiting term comprising any wireless device or node equipped with a radio interface allowing for at least one of: transmitting signals in the UL and receiving and/or measuring signals in the DL. Some examples of UE in its general sense are a PDA, laptop, mobile, and sensor. A UE may be and preferably is capable of operating or at least performing measurements in one or more frequencies, carrier frequencies, component carriers or frequency bands. A UE may operate in a single-RAT (radio access technology), a multi-RAT, or a multi-standard mode, e.g., an example dual-mode UE may operate with any one or a combination of WiFi and LTE.

A base station comprises in a general sense any node transmitting radio signals in the downlink (DL) and/or receiving radio signals in the uplink (UL). Some example base stations are eNB, eNB, Node B, macro/micro/pico radio base station, home eNB, relay, repeater, or sensor. A base station may operate and/or perform measurements in one or more frequencies, carrier frequencies or frequency bands and may be capable of carrier aggregation. A base station may also use a single-radio access technology (RAT), a multi-RAT, or operate using a multi-standard node, e.g., using the same or different base band modules for different RATs.

The example embodiments described herein are not limited to LTE, but may apply to any Radio Access Network (RAN), single-RAT or multi-RAT. Some other RAT examples are LTE-Advanced, UMTS, and cdma2000.

Embodiments described herein may be considered as independent embodiments or may be considered in any combination with each other to describe non-limiting examples. Reference throughout the specification to "one embodiment" or "an embodiment" means that a particular feature, structure, or characteristic described in connection with an embodiment is included in at least one embodiment of the present disclosure. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Referring to FIG. 1 now, FIG. 1 is a flow diagram of a method 100 for performing precoding according to an embodiment of the present disclosure. The method 100 starts at block 101, where a parameter indicative of reception quality on a downlink channel from a base station to a user equipment (UE) served by the base station is obtained.

In an embodiment, the parameter indicative of reception quality on a downlink channel can be obtained based on acknowledge/negative acknowledge (ACK/NACK) feedback transmitted from the UE. In many wireless communication systems, e.g. Code-Division Multiple Access (CDMA), Wideband Code-Division Multiple Access (WCDMA), High-Speed Packet Access (HSPA), HSPA+, Long Term Evolution (LTE), Long Term Evolution Advanced (LTE-A), and etc., when a base station transmits a signal (either a control signal or a data signal) to a UE, the UE will usually return an acknowledge/negative acknowledge (ACK/NACK) signal to indicate whether the UE has successfully decoded the transmitted signal or not. Thus, the ACK/NACK feedback transmitted from the UE can be used to obtain the parameter indicative of reception quality on a downlink channel.

An example of the parameter indicative of reception quality on a downlink channel is associated with Block Error Ratio (BLER). Based on the ACK/NACK feedback transmitted from the UE, the base station that serves the UE can know exactly whether each downlink transmission from the base station to the UE is correctly received by the UE or not. In the following, several examples of calculating a BLER-related parameter that is indicative of reception quality on a downlink channel will be given.

In an example, a downlink transmission sliding window can be configured and the window may have a fixed length N to contain the latest N times of downlink transmission from the base station to the UE. Since each downlink transmission will have a corresponding ACK/NACK feedback, the base station can accumulate the number M of NACK received for the latest N times of downlink transmission and calculate the BLER-related parameter as a ratio of M to N. In this example, for each downlink transmission, the base station will obtain a corresponding BLER-related parameter indicative of reception quality.

In the above example, the calculated BLER value is an instant value for each downlink transmission. In another example, an average of the BLER values can be calculated over the sliding window (i.e. the latest N times of downlink transmission) and then another BLER-related parameter can be calculated as a difference between the instant BLER value for each downlink transmission and the average value. In other words, this difference would represent the variance of each BLER value from the average value.

In yet another example, if the UE consecutively transmits NACK for the latest L times of downlink transmission, i.e. the UE has continuously failed to perform correct decoding of downlink transmission, a signal can be generated. And another BLER-related parameter indicative of reception quality can be obtained as the total number of such signals generated in a certain period of time.

Instead of directly calculating various BLER-related parameters as described above, in another embodiment, the retransmission number at the base station can be used to obtain a parameter indicative of reception quality on the downlink channel. In e.g. an LTE system, once the UE fails to decode a downlink package, the UE will feed back NACK to the base station and the base station will retransmit this package to the UE. The UE will combine these two downlink transmission together and try to decode again. If decoding fails again, the base station will retransmit this package again until the UE can successfully decode this package and feed back an ACK. So the reception quality on the downlink channel from the base station to the UE can also be obtained from the retransmission number.

Similar to the BLER-related parameters described above, there are also various ways of obtaining a parameter indicative of reception quality based on the retransmission number. In an example, a downlink transmission package sliding window can be configured and the window may have a fixed length N to contain the latest N downlink packages transmitted from the base station to the UE. Please be noted that the sliding window discussed here is a window for downlink transmission packages instead of downlink transmission as described above, because a package may be transmitted more than one times. In addition, a predefined maximum retransmission number can be set. If the retransmission number for a package is larger than the maximum retransmission number, then this package can be viewed as an abnormal retransmission package. And a parameter indicative of reception quality on the downlink channel can be calculated as a ratio of the number of packages (i.e. abnormal retransmission packages) whose retransmission number is larger than the predefined maximum retransmission number in the downlink transmission package sliding window to the length N of the downlink transmission package sliding window. Please be noted that for each transmitted downlink package, there will be a corresponding ratio value.

In another example, an average of the above calculated ratio values associated with the retransmission number can be calculated over the sliding window (i.e. the latest N downlink transmission packages) and then another retransmission-number-related parameter can be calculated as a difference between each of the ratio values and the average value, to indicate the reception quality on the downlink channel.

In yet another example, if a continuous retransmission number for a downlink package is larger than a predefined threshold for the latest M times of downlink transmission, a signal can be generated. And a retransmission-number-related parameter indicative of reception quality can be obtained as the total number of such signals generated in a certain period of time.

In another embodiment, the parameter indicative of reception quality on a downlink channel from the base station to the UE can be based on a downlink outer-loop adjustment value. In e.g. an LTE system, the base station will determine the downlink package size according to the decoding result (e.g. success or failure) of a UE. Due to ripple nature of the downlink channel characteristics, the downlink package size may need to be adjusted from time to time by an outer-loop adjustment module in the base station (e.g. eNB). For instance, if the UE feeds NACK back to the base station, it normally means that the base station may send a package that is too big to the UE. Thus, when the base station schedules the next package, it can decrease the package size, trying to make the UE decode correctly. On the other hand, if the UE reports ACK to the base station, it normally means that the base station may send a package that is too small to the UE. Accordingly, when the base station schedules the next package, it can increase the package size, trying to make full use of the downlink channel capacity. Therefore, the downlink outer-loop adjustment value (e.g. package size in this particular example) at the base station can be used to obtain a parameter indicative of reception quality on the downlink from the base station to the UE. For example, similarly, a downlink transmission sliding window can be configured and the window may have a fixed length N to contain the latest N times of downlink transmission from the base station to the UE. If the UE transmits ACK/NACK for a downlink transmission, the base station will generate a downlink outer-loop adjustment value. And the parameter indicative of reception quality can be calculated as a sum of the downlink outer-loop adjustment values generated within the downlink transmission sliding window. Please be noted that, package size is only an example of the downlink outer-loop adjustment value and those skilled in the art can conceive any other appropriate value (e.g. coding rate) and the present invention is not limited in this regard. Also note that, the above discussed numbers M, N and L can be set as needed by the operator.

It should be appreciated that the present invention is not limited to the above examples of a parameter indicative of reception quality and that those skilled in the art can conceive any other appropriate parameters to indicate the reception quality on a downlink channel.

Returning to FIG. 1, after the parameter indicative of reception quality on the downlink channel from the base station to the UE is obtained, the method 100 proceeds to block 102, where the obtained parameter is compared with a predetermined reception quality threshold. Then, at block 103, based on the comparison result, a precoding mechanism can be selected for use in communicating with the UE. The comparison in regard to the reception quality can indicate whether the currently used precoding mechanism is suitable for the current downlink channel characteristics (e.g. in terms of frequency selective and time dispersion). If the currently used precoding mechanism is suitable for the current downlink channel characteristics, the UE should be able to decode correctly the downlink transmission, i.e. the reception quality is good. However, if the currently used precoding mechanism is not suitable for the current downlink channel characteristics, there would be decoding failure at the UE side, i.e. the reception quality may be poor, and another precoding mechanism should be used for subsequent downlink transmission. Please be noted that the term "precoding mechanism" used herein refers to what precoding matrix or matrixes should be used for which frequency band(s) or subband(s) at which time.

According to the exemplary method of the present disclosure, a precoding mechanism is selected based on the reception quality on the downlink channel from a base station to a UE served by the base station. In this way, a precoding mechanism suitable for the downlink channel characteristics can be selected on a per-UE basis for use in communication with the UE. If the reception quality for a UE is not good enough, the exemplary method enables the base station to switch to another precoding mechanism. This can ensure a good reception quality for each UE and help improve the system performance in comparison with the approach of configuring only one precoding mechanism for all UEs in a cell. Moreover, by enabling the base station to switch between different precoding mechanisms automatically based on reception quality at the UE side, burden for the operator can be alleviated because the operator does not need to manually survey a specific cell in an attempt to configure or reconfigure a suitable precoding mechanism for the cell.

The exemplary method described above can be applied to a scenario where a UE is served by a single base station. In this case, the method can be carried out at this base station. However, the exemplary method can also be applied to a scenario where a UE is served by multiple base stations (i.e. CoMP (Coordinated MultiPoint)). In this way, blocks 101-103 of the method 100 can be carried out in one of the base stations or distributed among these base stations. In the latter case, logically the UE will see only one downlink channel, although there will be multiple physical downlink channels from the base stations to the UE. Please be noted that, in case a UE is served by multiple base stations in multiple cells, the UE usually will transmit ACK/NACK to a base station (referred to as source base station hereinafter) which serves a source cell where the UE locates. Thus, the source base station can calculate the parameter indicative of reception quality based on ACK/NACK reported by the UE or the source base station can transmit the ACK/NACK it receives to a neighboring base station, which then calculates the parameter. A similar process holds for blocks 102 and 103, depending on which base station will carry out the operation.

In an example, a frequency band over which wireless communications are carried out in the wireless communication system may comprise a plurality of sub-bands and the system may perform uplink measurement over one of the sub-bands, e.g. in order to reduce overhead of sounding resources. In this example, a precoding matrix for the UE for the one of the sub-bands can be determined based on uplink measurement over this sub-band. However, for the rest of the sub-bands, because there is no uplink measurement carried out for these sub-bands, a precoding matrix for these sub-bands can only be estimated. For example, a first precoding mechanism may be that, a precoding matrix for the UE for each of the other sub-bands is determined as the precoding matrix for the one of the sub-bands. In other words, the precoding matrix for the one of the sub-bands can be used as the precoding matrix for all the other sub-bands. A second precoding mechanism may be that, a precoding matrix for the UE for each of the other sub-bands is determined as the precoding matrix for the one of the sub-bands adjusted by a predefined diversity matrix for said each of the other sub-bands. Please be noted that the term "diversity matrix" refers to a scrambling matrix in terms of amplitude and phase for each of the other sub-bands the uplink measurements of which are not available, which matrix may be predefined to achieve a purpose of e.g. frequency selective.

Assuming that there are a total of N sub-bands and a total of S antennas in the wireless communication system. If uplink measurement is carried out on a sub-band i (i=0, 1, ... N−1), then an estimate for a DL channel from the base station (more specifically, an antenna) to the UE based on uplink measurements can be expressed as $H_s(i)$, where the variable s means an index of the antenna and s=0, 1 ... (S−1). Then a spatial antenna correlation matrix can be expressed as:

$$R_{SS}(i) = \begin{pmatrix} 1 & \cdots & r_{0,S-1}(i) \\ \vdots & \ddots & \vdots \\ r_{S-1,0}(i) & \cdots & 1 \end{pmatrix}$$

Where for each element $r_{m,n}$ in $R_{SS}(i)$, $r_{m,n}=H_m(i)*(H_n(i))^H$, m=0, 1, ... S−1, n=0, 1, ... S−1. Here the notation $(\ )^H$ means conjugate transpose operation to a complex value.

There are various ways of calculating a precoding matrix from the spatial antenna correlation matrix. An example is so called Eigen value based (EBB) precoding design. More specifically, Precoder(i)=Eigen$\{R_{SS}(i)\}$, where Precoder(i) represents a precoding matrix for sub-band i and Eigen( ) means to get the eigen vector of the spatial antenna correlation matrix. So the precoding matrix for sub-band i is a 1*S vector, each element of which is the phase shift & amplitude scaling for a specific antenna.

As explained, if uplink measurement is performed on only one of the sub-bands (e.g. sub-band $i_0$), then a precoding matrix for this sub-band $i_0$ (i.e. precoder($i_0$)) can be determined as outlined above. According to the first precoding mechanism, a precoding matrix for each of other sub-bands i is the same as precoder($i_0$). That is, precoder(i)=precoder($i_0$), where i=0, 1, ... N−1 and i≠$i_0$.

According to the second precoding mechanism, a precoding matrix for each of other sub-bands i is the precoding matrix for sub-band $i_0$ adjusted by a predefined diversity matrix. An example of the predefined diversity matrix can be based on cyclic phase shift, where the shift step is e.g. $2*\pi/K$, K is a fixed number, e.g. 4 (which means phase shift 90 degree per sub-band & antenna). Mathematically, the precoding matrix for sub-band i can be expressed as:

$$\text{precoder}(i) = \text{precoder}(i_0) * \begin{bmatrix} 1 & 0 & 0 \\ 0 & e^{j2\pi*(i-i_0)*1/K} & \\ \vdots & & 0 & \ddots \\ & 0 & & e^{j2\pi*(i-i_0)*(N-1)/K} \end{bmatrix}$$

where i=0, . . . , N−1 and i≠$i_0$.

In other words, the diversity matrix in this example is a diagonal cyclic phase shift matrix. However, it should be appreciated that other forms of diversity matrix can also be defined as appropriate and the present invention is not limited in this regard.

Figure 2:
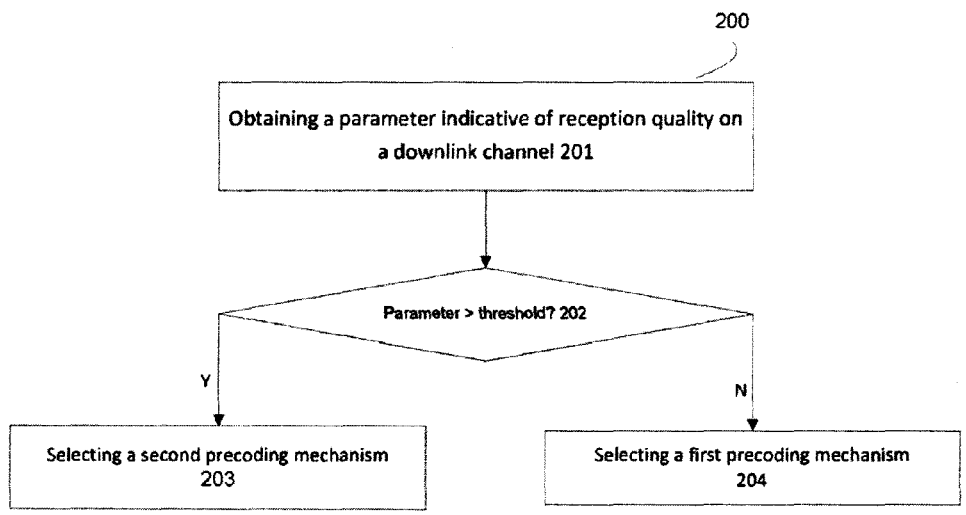
FIG. 2 is a flow diagram of another method for performing precoding according to another embodiment of the present disclosure.

With reference to FIG. 2 now, FIG. 2 is a flow diagram of another method for performing precoding according to another embodiment of the present disclosure. In particular, FIG. 2 shows a specific example of how to select between the first and second precoding mechanisms based on the comparison result. At block 201, a parameter indicative of reception quality on a downlink channel from a base station to a user equipment (UE) served by the base station is obtained. Examples of the parameter are given above and will not be described in detail here. At block 202, the obtained parameter is compared with a predetermined reception quality threshold. If the parameter is higher than the predetermined reception quality threshold, then the second precoding mechanism can be selected at block 203 and if the parameter is lower than the predetermined reception quality threshold, the first precoding mechanism can be selected at block 204.

As appreciated by those skilled in the art, different precoding mechanisms other than the first and second precoding mechanisms described above can be conceived and used in the wireless communication system. For instance, the cyclic phase shift matrix in the above example does not change the amplitude scaling of elements of a precoding matrix, however a diversity matrix can be designed to change both the phase shift and amplitude scaling of the precoding matrix. In addition, depending on different precoding meachanisms that can be used, the method 200 can proceed to different branches from block 202. In other words, if the first and second precoding mechanisms are different from what is defined in this particular example, then in case the obtained parameter is larger than the reception quality threshold, the first precoding mechanism (instead of the second one) can be selected.

Figure 3:
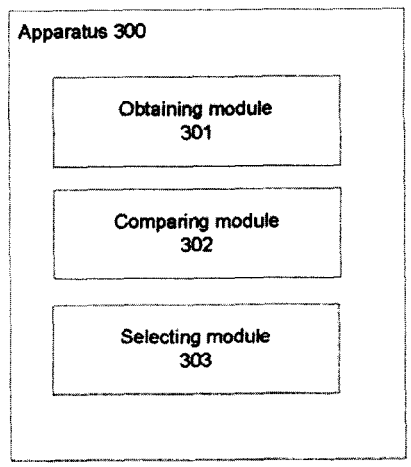
FIG. 3 is a diagrammatic view of an apparatus for performing precoding according to an embodiment of the present disclosure.

With reference to FIG. 3 now, FIG. 3 is a diagrammatic view of an apparatus 300 for performing precoding according to an embodiment of the present disclosure. As shown, the apparatus includes an obtaining module 301, a comparing module 302 and a selecting module 303. The obtaining module 301 is configured to obtain a parameter indicative of reception quality on a downlink channel from a base station to a user equipment (UE) served by the base station. In an example, the obtaining module 301 may be configured to obtain the parameter based on acknowledge/negative acknowledge (ACK/NACK) feedback transmitted from the UE. For instance, the parameter can be associated with a block error ratio (BLER), a downlink retransmission number and a downlink outer-loop adjustment value. The comparing module 302 is configured to compare the parameter with a predetermined reception quality threshold. And the selecting module 303 is configured to select a precoding mechanism for use in communicating with the UE based on comparison result provided by the comparing module 302.

Figure 4:
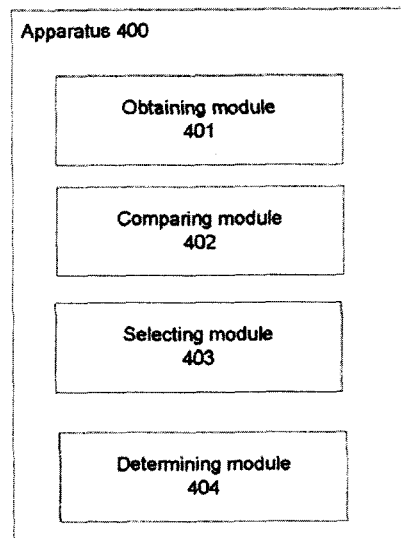
FIG. 4 is a diagrammatic view of another apparatus for performing precoding according to another embodiment of the present disclosure.

FIG. 4 illustrates another apparatus 400 for performing precoding according to another embodiment of the present disclosure. As shown, the apparatus 400 is almost the same as the apparatus 300 shown in FIG. 3, so functions of the obtaining module 401, the comparing module 402 and the selecting module 403 will not be described in detail herein. In addition, the apparatus 400 may further comprise a determining module 404. In this embodiment, a frequency band over which wireless communications are carried out in the wireless communication system comprises a plurality of sub-bands and the determining module 404 may be configured to determine a precoding matrix for the UE for one of the sub-bands based on uplink measurement over the one of the sub-bands. Further, the selecting module 403 may be further configured to select the precoding mechanism from a first precoding mechanism where the determining module 404 may be further configured to determine a precoding matrix for the UE for each of the other sub-bands as the precoding matrix for the one of the sub-bands and a second precoding mechanism where the determining module 404 may be further configured to determine a precoding matrix for the UE for each of the other sub-bands as the precoding matrix for the one of the sub-bands adjusted by a predefined diversity matrix for said each of the other sub-bands.

In an example, the selecting module 403 may be further configured to select the second precoding mechanism if the parameter is higher than the predetermined reception quality threshold, and select the first precoding mechanism if the parameter is lower than the predetermined reception quality threshold.

Figure 5:
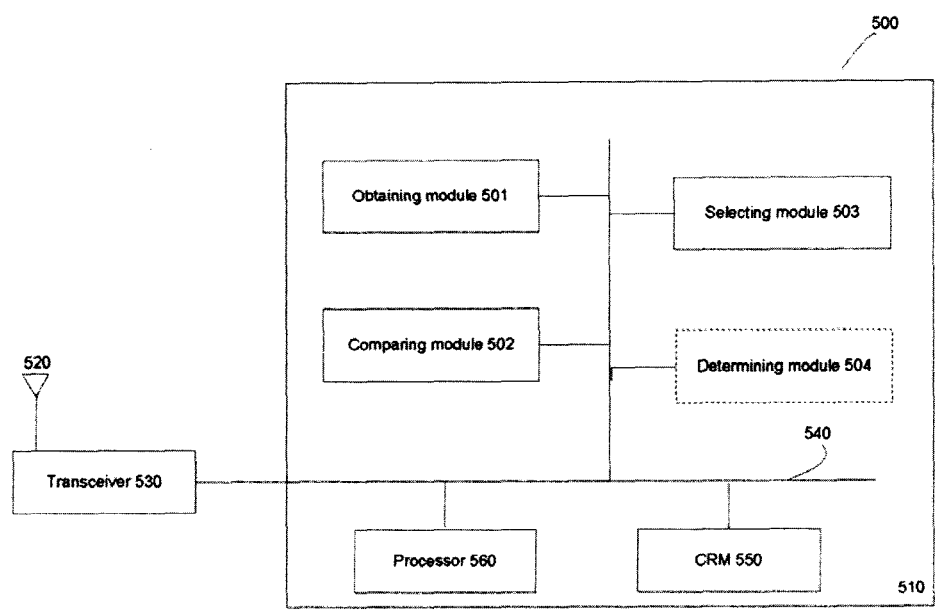
FIG. 5 is a diagrammatic view of a base station according to an embodiment of the present disclosure.

Referring now to FIG. 5, FIG. 5 is a diagrammatic view of a base station according to an embodiment of the present disclosure.

The base station 500 employs a processing system 510, may be implemented with a bus architecture, represented generally by the bus 540. The bus 540 may include any number of interconnecting buses and bridges depending on the specific application of the processing system 510 and the overall design constraints. The bus 540 links together various circuits including one or more processors and/or hardware modules, represented by the processor 560 and the computer-readable medium 550. The bus 540 may also link various other circuits such as timing sources, peripherals, voltage regulators, and power management circuits, which are well known in the art, and therefore, will not be described any further.

The base station 500 includes a processing system 510 coupled to a transceiver 530. The transceiver 530 is coupled to one or more antennas 520. The transceiver 530 enables communicating with various other apparatus over a transmission medium. The processing system 510 includes a processor 560 coupled to a computer-readable medium 550. The processor 560 is responsible for general processing, including the execution of software stored on the computer-readable medium 550. The software, when executed by the processor 560, causes the processing system 510 to perform the various functions described for any particular base station. The computer-readable medium 550 may also be used for storing data that is manipulated by the processor 560 when executing software.

The processing system 510 contains modules 501-503 linked together by the bus 540. In an example, the processing system 510 includes an obtaining module 501, a comparing module 502 and a selecting module 503. The processing system 510 may further contain a determining module 504. Functions of these modules 501-504 can refer to discussion in conjunction with FIG. 3 and FIG. 4 and description thereof will be omitted herein.

Those of skill would further appreciate that the various illustrative logical blocks, units, modules, circuits, and algorithm steps described in connection with the disclosure herein may be implemented as electronic hardware, computer software, or combinations of both. To clearly illustrate this interchangeability of hardware and software, various illustrative components, blocks, units, modules, circuits, and steps have been described above generally in terms of their functionality. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

The various illustrative logical blocks, units, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in Random Access Memory (RAM memory), flash memory, Read Only Memory (ROM memory), Electrically Programmable Read-Only Memory (EPROM memory), Electrically Erasable Programmable Read Only Memory (EEPROM memory), registers, hard disk, a removable disk, a Compact Disk-Read-Only Memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a base station. In the alternative, the processor and the storage medium may reside as discrete components in a base station.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for performing precoding in a wireless communication system, the method comprising:
    obtaining a parameter indicative of reception quality on a downlink channel from a base station to a user equipment (UE) served by the base station;
    comparing the parameter with a predetermined reception quality threshold; and
    based on the comparison result, selecting a precoding mechanism for use in communicating with the UE;
    wherein a frequency band over which wireless communications are carried out in the wireless communication system comprises a plurality of sub-bands and a precoding matrix for the UE for one of the sub-bands is determined based on uplink measurement over the one of the sub-bands, and
    wherein the precoding mechanism is selected from a first precoding mechanism where a precoding matrix for the UE for each of the other sub-bands is determined as the precoding matrix for the one of the sub-bands and a second precoding mechanism where a precoding matrix for the UE for each of the other sub-bands is determined as the precoding matrix for the one of the sub-bands adjusted by a predefined diversity matrix for said each of the other sub-bands.

2. The method of claim 1, wherein said parameter is obtained based on acknowledge/negative acknowledge feedback transmitted from the UE.

3. The method of claim 1, wherein said parameter is associated with a block error ratio, a downlink retransmission number and a downlink outer-loop adjustment value.

4. The method of claim 1, wherein said selecting comprises:
    if the parameter is higher than the predetermined reception quality threshold, selecting the second precoding mechanism and if the parameter is lower than the predetermined reception quality threshold, selecting the first precoding mechanism.

5. A base station configured to perform precoding in a wireless communication system, the base station comprising:
- a transceiver configured to communicate with one or more apparatuses over a transmission medium; and
- a processing circuit configured to:
  - obtain a parameter indicative of reception quality on a downlink channel from a base station to a user equipment (UE) served by the base station;
  - compare the parameter with a predetermined reception quality threshold; and
  - select a precoding mechanism for use in communicating with the UE based on comparison result provided by the comparing module;
- wherein a frequency band over which wireless communications are carried out in the wireless communication system comprises a plurality of sub-bands and wherein the processing circuit is further configured to:
  - determine a precoding matrix for the UE for one of the sub-bands based on uplink measurement over the one of the sub-bands, and
  - select the precoding mechanism from a first precoding mechanism whereby the precoding matrix is determined for the UE for each of the other sub-bands as the precoding matrix for the one of the sub-bands, and a second precoding mechanism whereby the precoding matrix is determined for the UE for each of the other sub-bands as the precoding matrix for the one of the sub-bands adjusted by a predefined diversity matrix for said each of the other sub-bands.

6. The base station of claim 5, wherein the processing circuit is configured to obtain the parameter based on acknowledge/negative acknowledge feedback transmitted from the UE.

7. The base station of claim 5, wherein said parameter is associated with a block error ratio, a downlink retransmission number and a downlink outer-loop adjustment value.

8. The base station of claim 5, wherein the processing circuit is configured to select the second precoding mechanism if the parameter is higher than the predetermined reception quality threshold, and select the first precoding mechanism if the parameter is lower than the predetermined reception quality threshold.

* * * * *